(12) United States Patent
Jacobsen (10) Patent No.: US 7,145,669 B2
(45) Date of Patent: Dec. 5, 2006

(54) PARTIALLY PRE-RASTERIZING IMAGE DATA

(75) Inventor: Dana A. Jacobsen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 779 days.

(21) Appl. No.: 10/353,333

(22) Filed: Jan. 28, 2003

(65) Prior Publication Data

US 2004/0145586 A1 Jul. 29, 2004

(51) Int. Cl.
*G06F 3/12* (2006.01)
*G06K 15/00* (2006.01)

(52) U.S. Cl. ..................... 358/1.13; 358/1.14
(58) Field of Classification Search .......... 358/1.1–1.2, 358/1.6, 1.9, 1.13, 1.14, 1.16, 1.17, 1.18, 358/523, 528, 426.02, 426.04, 426.05
See application file for complete search history.

(56) References Cited

U.S. PATENT DOCUMENTS

| | | | |
|---|---|---|---|
| 5,129,049 A | 7/1992 | Cuzzo et al. | |
| 5,524,186 A | 6/1996 | Campbell | |
| 6,166,827 A | 12/2000 | Campbell et al. | |
| 6,249,835 B1 | 6/2001 | Isoda | |
| 6,356,278 B1 | 3/2002 | Stamm et al. | |
| 6,456,387 B1 * | 9/2002 | Pardo et al. | 358/1.13 |
| 6,504,622 B1 * | 1/2003 | Campbell et al. | 358/1.17 |
| 6,594,029 B1 * | 7/2003 | Mellor et al. | 358/1.15 |

* cited by examiner

*Primary Examiner*—Douglas Q. Tran (57) ABSTRACT

A method of partially pre-rasterizing image data in a printing device includes evaluating image data for an image strip, estimating a minimum amount of the image data to be pre-rasterized in order to avoid a print overrun, and pre-rasterizing said minimum amount of image data.

13 Claims, 4 Drawing Sheets

PARTIALLY PRE-RASTERIZING IMAGE DATA

BACKGROUND

As used herein, a printer or printing device is a device that produces a hardcopy document from electronic data. Types of printers and printing devices include, but are not limited to, laser printers, inkjet printers, facsimile machines, digital copiers, multi-function peripherals, etc.

In laser printers, the print engine typically includes a scanning laser that is modulated in response to electronic data that represents the image being printed. The modulated laser beam is used to write a latent image in a field of charges on an imaging drum. The latent image on the drum is then developed by applying a charged toner that will adhere to, or is repelled from, the imaging drum in accordance with the charge pattern written to the drum by the laser. The toner image is then transferred from the imaging drum to a print medium, such as paper.

Before image data can be used to modulate the laser of a print engine, the data must be appropriately formatted. This formatting is also referred to in the art as "rasterizing" or "rendering" the data. In such printing systems, image data rasterizing can either be performed on the host computer submitting the print job to the printing device, with large volumes of rasterized image data being shipped to the printer at high speed, or on a formatter within the printing device itself.

In printing devices that employ a laser print engine, the rasterized image data must be provided at a speed fast enough to keep up with the printing action as measured by the rate at which the laser writes data to the imaging drum or the rate of movement of the paper or other print medium past the imaging drum. Since a conventional laser print engine operates at a constant speed, if rasterized image data is not available to the print engine when a previous segment of image data has been used, a "print overrun" or printing error occurs and printing stops.

Consequently, the formatter that formats or rasterizes the image data for use by the print engine "races" the output task that modulates the laser of the print engine to write the desired image onto the imaging drum. This is commonly termed "racing the laser."

Several methods have been developed to avoid print overruns. In one such method, all the data for each page of the print job is rasterized before the printing of that page starts. In other words, a full raster bit map of an entire page is generated and stored or received in the printer before the printing of that page begins so that the print engine is assured of always having rasterized data waiting while the page is printed. A pause between pages, if necessary, does not cause a print overrun. This solution requires relatively large amounts of random access memory (RAM) in the printer to store the full raster bit map for each page in succession.

A second method for assuring the availability of rasterized image data involves identifying portions of the image to be printed that are relatively difficult to rasterize due to the amount of image data at those portions of the image. Once identified, these portions may be formatted or rasterized in advance.

In this method, a page description is received from a host computer and converted into a series of simple commands, called display commands. The collection of display commands is known as a display list. The display commands describe objects to be printed. The display commands are parsed and sorted according to their vertical position on the page. The page is then logically divided into sections called image strips or bands. The image strips are then individually rasterized, i.e., the described objects in each successive strip are rendered into a raster bit map that is passed to the print engine for printing.

This procedure enables lesser amounts of RAM to be used for rasterization and allows for faster printing. When the display commands are rasterized at a fast enough pace, the same memory used to store a first strip can then be reused for a subsequent strip further down the page. For example, in certain printers it is known to employ three buffers for storing image strips. During page processing, the first buffer is reused for a fourth strip on the page after the printing of a first strip; the second buffer is reused for a fifth strip, and so on.

However, there may be little time available between the use of rasterized data in a buffer for printing one strip and the need to finish storing rasterized data in the same buffer for a subsequent strip. "Complex" strips include a relatively large number of display commands and may require a longer than average time for rasterization. Additionally, to rasterize a strip (whether complex or not), more memory space may be required than is available depending upon several factors associated with the printer, including memory size, memory fragmentation, and other printer system activities that are then occurring.

In the case of a complex strip, rasterization time may increase to such an extent that the succeeding strip cannot be delivered to the print engine on time, thus causing a print overrun to occur. Accordingly, complex strips may be identified in advance and pre-rasterized, i.e., fully rasterized before the printing of a previous strip begins, to ensure that the race with the laser will not be lost and result in a print overrun.

In general, these methods of racing the laser require a difficult trade off between the amount of printer memory required and real-time processing resources. While it is possible to avoid print overruns by entirely pre-rasterizing every image strip or each complete page, complete pre-rasterization consumes significant memory resources which greatly impacts the cost of the printer. Alternatively, if rasterization is performed on a strip-by-strip basis, with complex strips being identified and pre-rasterized, significant memory and processing resources will still have to be provided.

SUMMARY

In one embodiment, the present invention provides a method of partially pre-rasterizing image data in a printing device by evaluating image data for an image strip, estimating a minimum amount of the image data to be pre-rasterized in order to avoid a print overrun, and pre-rasterizing said minimum amount of image data.

In another embodiment of the present invention, a method for printing a page with a printing device includes receiving a page description in the printing device, converting the page description into a display list, sectioning the display list into image strips, determining if each of the image strips can be rasterized within a predetermined amount of time, and, if an image strip cannot be rasterized within the predetermined amount of time, estimating a minimum amount of the image strip to be pre-rasterized to avoid print overrun and pre-rasterizing the minimum amount of the image strip.

In another embodiment of the present invention, a method of partially pre-rasterizing image data in a printing device includes dividing each page of a print job into image strips, determining a fraction of image data from an image strip to be pre-rasterized in order to avoid a print overrun, and pre-rasterizing the fraction of image data for the image strip.

BRIEF DESCRIPTION OF THE DRAWINGS

The accompanying drawings illustrate embodiments of the present invention and are a part of the specification. The illustrated embodiments are merely examples of the present invention and do not limit the scope of the invention.

Throughout the drawings, identical reference numbers designate identical elements.

DETAILED DESCRIPTION

The methods and systems described herein help reduce print times for racing laser printers while simultaneously helping to assure that a constant speed print mechanism always has rasterized data waiting so as to avoid a print overrun error. According to one exemplary embodiment, described more fully below, image strips may be partially pre-rasterized to reduce the processing time required for that strip during actual printing.

In the following description, for purposes of explanation, numerous specific details are set forth in order to provide a thorough understanding of the described embodiments. It will be apparent, however, to one skilled in the art that the embodiments can be practiced without these specific details. For ease of explanation only, the following description will be developed in the context of a single page being printed. However, the principles described also apply to multi-page "pipelined" print jobs.

Figure 1:
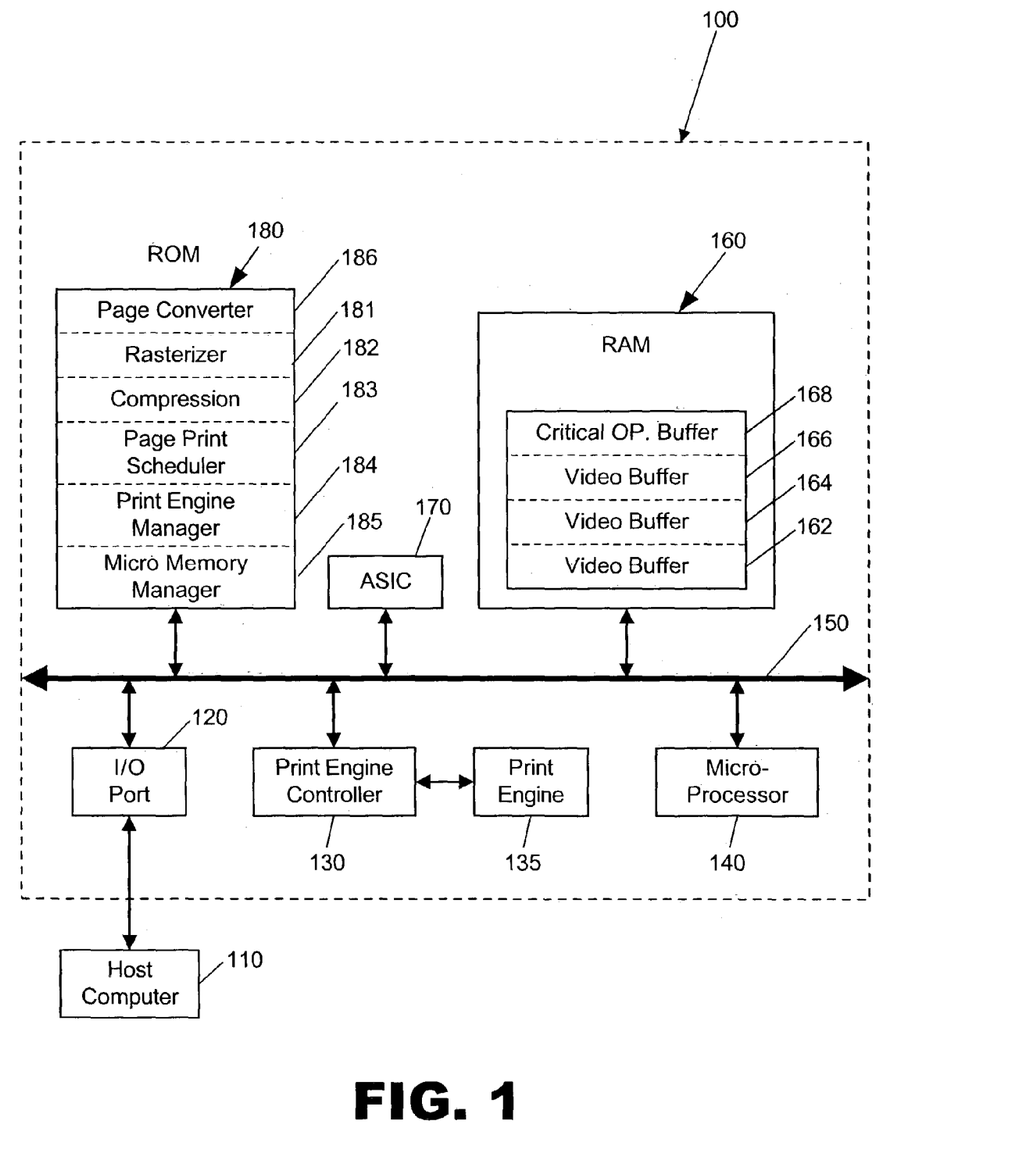
FIG. 1 is a block diagram illustrating a laser printer according to one embodiment of the present invention.

FIG. 1 is a block diagram illustrating a printer (100) with an ability to avoid print overrun errors while minimizing the amount of memory and processing resources used. The printer (100) also reduces the time required to produce the first page of a print job, known as the first page out (FPO) time, as compared to racing printers that entirely pre-rasterize all image strips or an entire page at a time. Printer (100) may be any device that produces a hardcopy document from electronic image data.

Printer (100) is controlled by a microprocessor (140) that communicates with other elements of the system via a bus (150). A print engine controller (130) and associated print engine (135) are connected to bus (150) and provide the print output capability for the printer (100). Print engine (135) is preferably a laser print engine that employs a modulated laser writing a latent image in a charge field on an imaging drum. However, the principles described herein are similarly applicable to other types of printers and/or imaging devices such as digital copiers, facsimile devices and the like.

An input/output (I/O) port (120) provides communications between the printer (100) and a host computer (110). The printer (100) receives print jobs, including page descriptions, from the host computer (110) for processing by the printer (100).

A dynamic random access memory (RAM) (160) provides a main memory for the printer (100). RAM (160) is representative of a general purpose memory and/or a cache memory for use by the processor (140). A first portion of RAM (160) includes, in this example, three pre-allocated (reserved) buffers (162, 164, and 166) (hereinafter 162-166), which are employed during image strip processing. These buffers may be video buffers or some other type of pre-allocated buffer.

During the print process, each pre-allocated buffer receives rasterized image data for a respective image strip. The buffer receives the rasterized image data for storage and eventual transmission to the print engine (135). Only after one of the buffers (162–166) becomes available, e.g., rasterized data in that buffer is transferred to the print engine (135), can rasterized data for a next image strip be received in that buffer. During a multi-page (pipelined) print job, these buffers are constantly in use and are used only for temporarily storing the rasterized image data prior to output of the image data to the print engine.

A second portion of RAM (160) includes another pre-allocated (reserved) buffer (168). The pre-allocated buffer (168) is a critical operations buffer and is used for storing critical operation data for the express purpose of reducing printing pauses by the print engine (135) which would potentially otherwise occur due to fragmentation of the general memory area (160) and the general contention for memory resources during processing of print commands.

Preferably, the critical operations buffer (168) is used to store data that requires a contiguous allocation of memory. For example, data stored in the critical operations buffer (168) may include, selectively, pre-rasterized data, compressed data, pre-rasterized and compressed data, rendered character bitmaps, scaled raster objects, rotated raster objects, vector path data, or other data used for defragmenting memory (160). The critical operations buffer (168) is preferably released for other use after completion of any particular critical operation or at least upon completion of a page being printed.

A read only memory (ROM) (180) contains firmware, which controls the operation of the microprocessor (140) and printer (100). Although the firmware routines are described as stored in ROM (180), it is understood that they may be stored in other forms of memory or their functionality may likewise be implemented in an application-specific integrated circuit (ASIC) (170) or other device. The routines (code procedures) stored in ROM (180) include the following: a page converter (186), a rasterizer (181), compression code (182), a page print scheduler (183), and a print engine manager (184).

The page converter firmware (186) converts a page description received from the host computer to a display command list, where each display command defines an object to be printed on the page. The page converter firmware (186) also divides the page into image strips. The rasterizer firmware (181) converts each display command to an appropriate rasterized bit map and distributes the bit map into memory (160). The compression firmware (182) compresses the rasterized strips or other data as necessary. ROM (180) further includes a micro memory manager (185) that governs memory management during print overrun protection processing.

When processing of a page is closed, i.e., all strips have been defined, evaluated, pre-rasterized (as needed), compressed, etc., for processing by the print engine (135), then the rasterized strips are stored respectively in the pre-allocated buffers (162–166) and subsequently passed to print engine (135) by the print engine controller (130). The page print scheduler (183) controls the sequencing and transferring of data from the strip buffers to the print engine controller (130). The print engine manager (184) controls the operation of the print engine controller (130) and, in turn, the print engine (135).

The operation of the printer (100) shown in FIG. 1 commences when the printer (100) receives a print job or a page description from a host computer (110) via the I/0 port (120). The page description is placed in RAM (160) and the microprocessor (140) then accesses the description, line by line, and builds a display command list using the page converter firmware (186) located in ROM (180). The display command list is a set of commands that describe what must be printed and forms an intermediate description of the page that can subsequently be converted to a rasterized bit map by the rasterizer (181) for use by the print engine (135). As the display command list is being produced, the display commands are sorted by location on the page and allocated to image strips.

Figure 2:
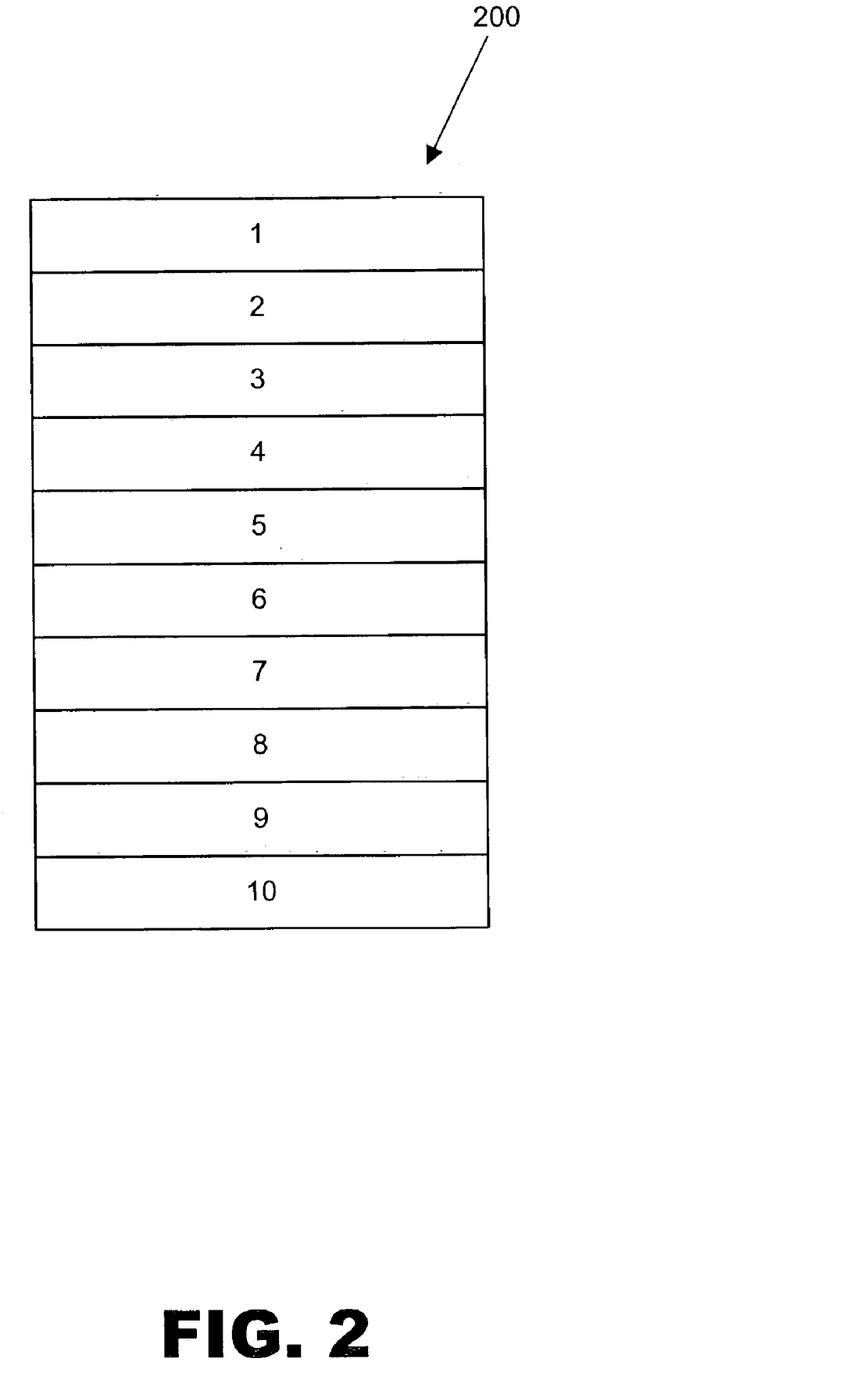
FIG. 2 illustrates a print page separated into strips according to an embodiment of the present invention.

FIG. 2 illustrates one example of how a page (200) may be divided into a series of image strips. In the example of FIG. 2, ten strips are shown, each one covering a horizontal portion of the page (200). Text, graphics, etc., appearing in any one image strip are treated separately during the processing of a page as described herein.

Assuming that the printer has the capability of producing eight pages per minute, each page is produced in 7.5 seconds. Since there are ten strips, each strip is arbitrarily allocated a rasterization time of 0.75 seconds. The strip rasterization time indicates the available time for processing (i.e., rasterizing) a series of page intermediate display commands assigned to an image strip. If rasterization can be accomplished within the available time, the printer is able to maintain its specified page print rate without a print overrun occurring. The choice of ten strips is merely exemplary and other image strip allocations can be used.

Processing time is accumulated as the printing process is performed. Generally, the first few strips are pre-rasterized and stored in the three pre-allocated buffers (162–166; FIG. 1). Once the print engine (135, FIG. 1) is started, the data corresponding to the first strip can immediately be sent to the print engine (135). Generally, if the page takes 7.5 seconds, then the last strip must be ready to send with at least 0.75 seconds of processing time remaining for the page. According to this embodiment, that data for strip 1 is ready immediately. Therefore, strip 1 is preferably pre-rasterized regardless of any other considerations.

Strip 2 should be ready for printing as soon as strip 1 is finished. If strip 2 is pre-rasterized, then no time is spent on strip 2 at race time and the allocated processing time designated for the processing of strip 2 is accumulated and available for the processing of strip 3 or a later strip. If strip 2 was not pre-rasterized, the allocated processing time for strips 1 and 2 may be initially allocated for the processing of strip 2. If any process time is unused on strip 2, that unused time is accumulated and used on the next or a subsequent strip. In this manner, unused time is accumulated as the page is processed.

During the time that the page description is being converted to display commands, each command is sorted by position and assigned to one of the various image strips. Each display command is examined and its rasterization execution time (RET), i.e., the time required to rasterize that particular display command is determined. The RET's for all display commands assigned to each strip are summed to derive a total RET for each strip.

A rasterization time available (RTA) represents the processing time available to rasterize the current strip. The RTA can be calculated by adding any accumulated surplus processing time from previously processed strips to the time allocated for the current strip.

Rasterization time is related to the size of an object being described with display commands. The rasterization time for any object can be determined by summing three separate coefficients. The first coefficient is termed "overhead" and is the fixed amount of time the microprocessor (140) spends rasterizing an object, independent of its size. The second coefficient is a "height cost" which is proportional to the object's height, independent of its width. The third coefficient of this sum is termed "word cost" and is proportional to the number of words written to the destination bit map for that strip, independent of the object's height.

The relationship between an object's actual RET and the predicted RET is dependent upon the rasterization algorithm used and the execution speed of the microprocessor. Thus additional coefficients may be deemed useful, dependent upon the specifically used rasterization algorithms. Additional coefficients may also be useful to factor in such things as raster operations (ROPs), alpha blending, and other things that may affect the RET computation.

RETs for all objects can thus be determined, each with a different set of coefficients. Once the coefficients are determined for various expected objects, they are stored in a table and subsequently accessed when the type and dimensions of an object to be printed become known. Thus, an RET for any display command can be determined from a lookup table of pre-calculated rasterization times associated with the coefficients that define object followed by a calculation of the sum of the rasterization times associated with those coefficients. Occasionally, the pre-calculated rasterization time will need to be modified by the size of the objects.

Referring again to FIG. 1, the printer (100), during page composition, computes the size of an object when placing the display command for that object in the list. Given the object's size and its complexity coefficients, the total time needed to render that object into rasterized form is added to the RET of objects already contained within the list for that strip. Once page composition is complete, a total RET needed to render the entire display list is known, as is the time required to render each individual image strip.

At this point, the composed page is turned over for printing to the page print scheduler (183) contained in ROM (180). The page print scheduler firmware (183) contains a page protection sub-routine that prevents print overruns as a result of one or more strips requiring more rasterization time than the rasterization time available (RTA).

If, for a given strip, RET is equal to or less than RTA, indicating that the strip can be rasterized within the available time, the strip will be allowed to race the laser and no pre-rasterization need be performed. However, if RET exceeds RTA for a given strip, indicating that rasterization will take more time than is available, a portion of the display command list is pre-rasterized. This is different from previous systems that pre-rasterize all or nothing of the data for a given image strip.

By pre-rasterizing a portion of the display command list, the RET for that strip is reduced proportionate to the amount of data that is pre-rasterized. Once sufficient pre-rasterization has been performed to allow RET to be equal to or less than RTA, pre-rasterization will cease and the strip will race the laser, using the partially rasterized area as the beginning background for further rasterization. In this manner the strip is rasterized "just enough" to allow racing the laser to succeed for each strip.

Figure 3:
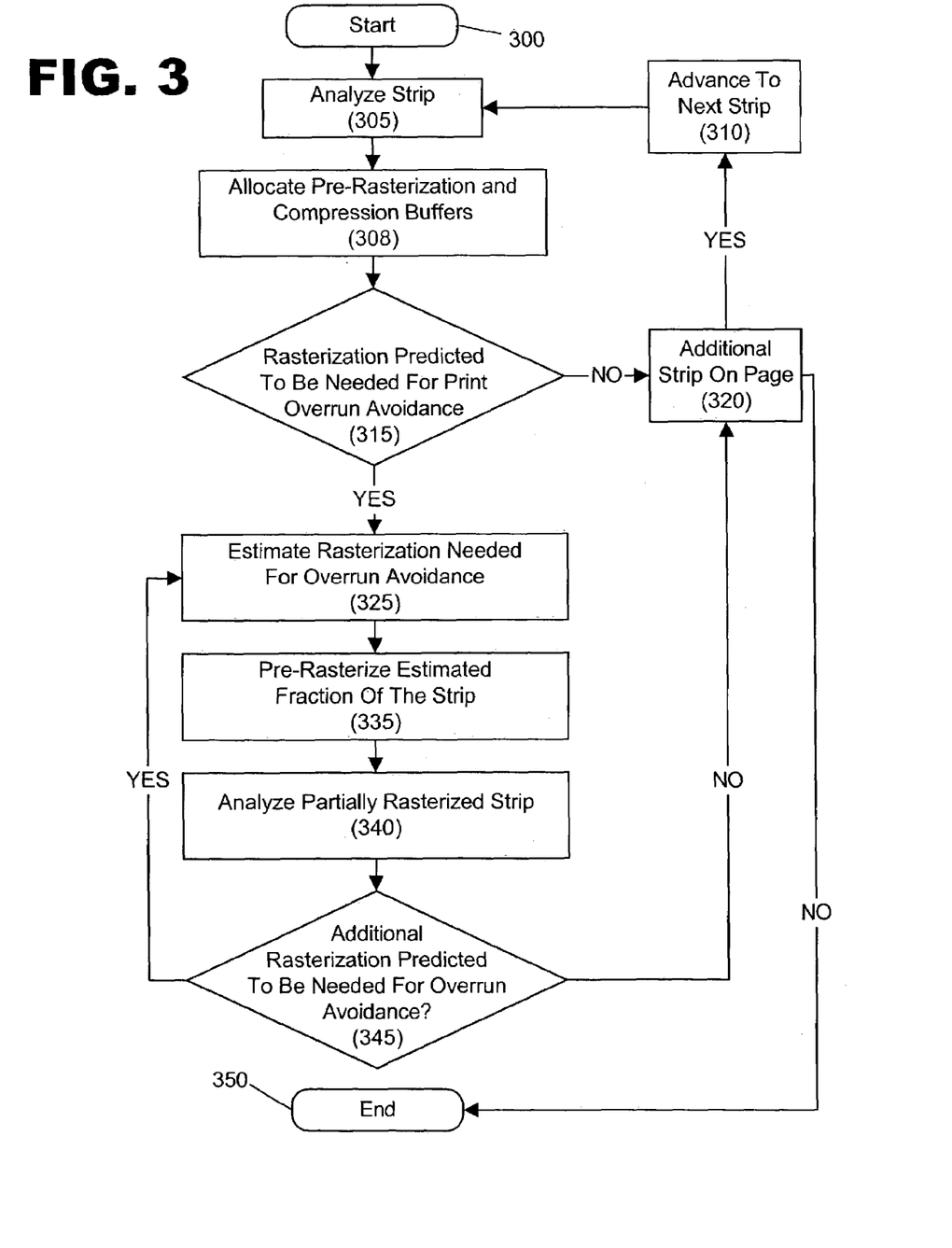
FIG. 3 is a flowchart demonstrating a print data evaluation method according to an embodiment of the present invention.

FIG. 3 illustrates one embodiment of a decision making process that determines if, and to what extent, a strip is pre-rasterized to avoid a print overrun error. The method described also decreases the process time required to produce the first printed page in the printer as compared to methods that simply re-rasterize all image strips or all data for a page.

As shown in FIG. 3, an image strip from a page of image data is analyzed (step 305) to determine whether pre-rasterization needs to occur for print overrun avoidance (determination 315). This analysis is a calculated estimate of whether the time required to rasterize the image strip will exceed the time available.

As indicated, it may frequently be desirable to pre-rasterize the first strip of a page. In preparation for that initial, fully rasterized strip and additional strips that may be partially pre-rasterized, a number of pre-rasterization buffers are allocated (step 308) in the memory (160, FIG. 1).

If the analysis concludes that pre-rasterization is needed for a given image strip (determination 315) (i.e., the RET is greater than RTA), an estimation is made of the amount of the strip that should be pre-rasterized in order to avoid a print overrun (step 325). If, however, the process predicts that no pre-rasterization is needed for print overrun avoidance, the entire strip is left to be rasterized during submission to the print engine of the data for the proceeding strip and the print overrun protection process moves to the next strip (steps 320 and 310).

As shown in FIG. 3, when it is determined that some pre-rasterization is required, an estimation of the amount of pre-rasterization needed is performed (step 325). This estimation is performed by subtracting the available processing time from the estimated strip processing time (step 325). The resulting difference is a quantification of the amount of processing time that causes the specified strip to exceed the RTA. A portion of the strip's display list corresponding to the amount by which the anticipated processing time for the strip exceeds the time available is then pre-rasterized (step 335). The partially rasterized data is then stored in a buffer.

The partial pre-rasterization of the strip preferably begins with the first display commands of the strip and continues until sufficient display commands have been selected from the strip to reduce the subsequent rasterization time for the strip to within the RTA. The remaining strip (minus the pre-rasterized portion) may then be re-analyzed (step 325) in order to confirm that the strip can now successfully race the laser or to determine whether more pre-rasterization should be performed to prevent print overrun (determination 345).

If more pre-rasterization is desired for print overrun avoidance (determination 345), the amount of pre-rasterization required to avoid print overrun is once again estimated (step 325) as described above. This process iterates until the strip has been rasterized "just enough" to avoid a print overrun. By pre-rasterizing only the portion of each image strip that would otherwise cause rasterization of the strip to exceed the RTA, each of the image strips is able to successfully race the laser while requiring a minimum of memory and processing resources.

Once a strip has been analyzed and pre-rasterized, the process continues with the next strip on the page (step 310), if there are any. If there are additional strips on the page, image processing (or print overrun protection processing) advances to the next strip (step 310) and the process (300) repeats as previously described. If there are no more strips, then the print overrun protection process is finished for the current page and can be started for a subsequent page, if any. When the entire page has been processed "just enough" for print overrun protection, the page print scheduler (183) located in ROM (180) causes the print engine to begin printing.

Figure 4:
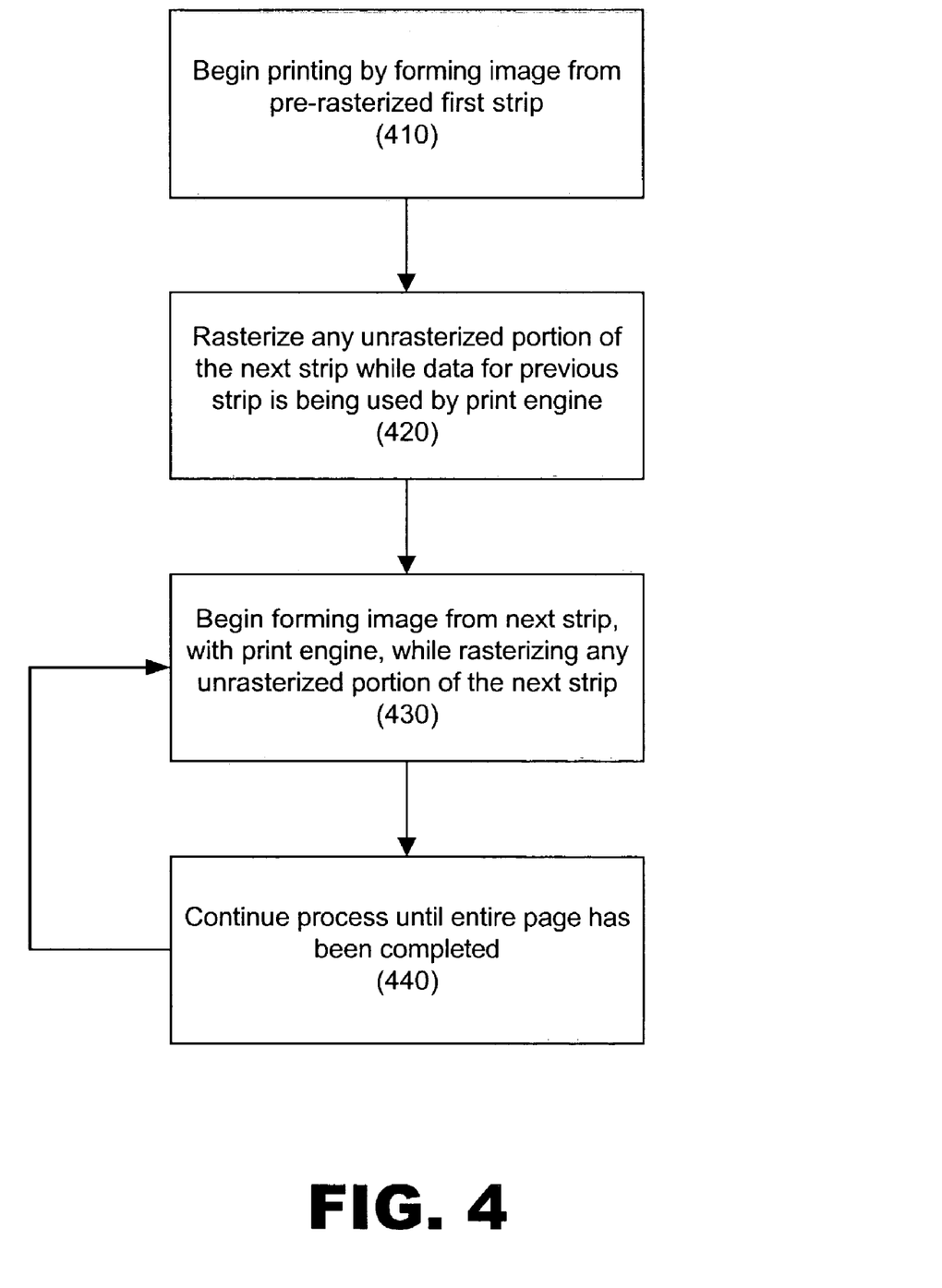
FIG. 4 is a flowchart demonstrating a printing process on a strip-by-strip basis according to an embodiment of the present invention.

FIG. 4 illustrates the printing order for each strip once the printing process has begun. Each strip covers a certain number of scan lines (e.g. 128 scan lines) of the page. When a strip is rasterized, the rasterization process creates all 128 lines contained in the strip. The objects on a strip can cross multiple lines and are temporally ordered. Thus, the process of pre-rasterizing part of a strip creates two things: a partially rasterized strip and a reduced display list, where the first N objects (in temporal order) have been processed, i.e., rasterized. To create the final rasterized data set for the strip, the remainder of the display list is then rasterized in a race with the laser.

As shown in FIG. 4, the first strip on a page is preferably pre-rasterized and sent to the print engine only after being fully rasterized (step 410). While the image corresponding to the first strip is being formed by the print engine, the second strip is rasterized, to the extent still needed (step 420). If the second strip was determined to require more time for rasterization that is available during submission of the first strip to the print engine, some portion of the second strip was pre-rasterized.

When the print engine exhausts the rasterized data associated with the first strip, the print engine is fed the data for the just-rasterized strip 2 (step 430). In this manner the data rasterizing process is able to stay just ahead of the image-forming laser. This process is performed for each strip of the page until the entire page has been printed (step 440).

The preceding description has been presented only to illustrate and describe embodiments of the invention. It is not intended to be exhaustive or to limit the invention to any precise form disclosed. Many modifications and variations are possible in light of the above teaching. While the invention has been described in a laser printer environment, it is equally applicable to other types of image forming devices that may experience print overrun type considerations (e.g. ink jet printers, copiers). Accordingly, the present invention is intended to embrace all such alternatives, modifications and variances that fall within the scope of the appended claims.

What is claimed is:

1. A method for printing a page with a printing device comprising:

receiving a page description in the printing device;

converting the page description into a display list;

sectioning the display list into image strips;

determining if each of the image strips can be rasterized within a predetermined amount of time; and if an image strip cannot be rasterized within the predetermined amount of time, estimating a minimum amount of the image strip to be pre-rasterized to avoid print overrun and pre-rasterizing said minimum amount of the image strip.

2. The method of claim 1, wherein sectioning the display list into strips comprises:

sorting display commands of the display list by vertical location on a page;

and allocating the sorted display commands Into groups of display commands corresponding to horizontal image strips of the page.

3. The method of claim 1, wherein determining if the image strips can be rasterized within the predetermined amount of time comprises:
   calculating a rasterization execution time (RET) for the image strip;
   calculating a rasterization time available (RTA) for the image strip; and
   comparing the RET of the image strip to the RTA of the image strip.

4. The method of claim 3, wherein a surplus processing time fi-om an RET for a previous image strip is added to the RTA for the image strip.

5. The method of claim 3, wherein estimating an amount of the image strip to be pre-rasterized to avoid print-overun comprises:
   subtracting the RTA of the image strip from the RET of the image strip; and
   converting a difference between the RTA and RET into a corresponding quantity of display list commands in the image strip.

6. The method of claim 1, further comprising printing the page including:
   rasterizing a remainder of the image strip during use by a print engine of rasterized data for a previous image strip; and
   sending rasterized data for the image strip to the print engine.

7. The method of claim 6, wherein rasterizing a remainder of the image strip and sending rasterized data for the image strip to the print engine are performed on each image strip of the display list in sequence.

8. A machine-readable medium comprising instructions that, when executed by a processor of a printing device, cause the processor to:
   receive a page description in the printing device;
   convert the page description into a display list;
   section the display list into image strips;
   determine if each of the image strips can be rasterized within a predetermined amount of time; and
   if an image strip cannot be rasterized within the predetermined amount of time, estimate a minimum amount of the image strip to be pre-rasterized to avoid print overrun and pre-rasterizing said minimum amount of the image strip.

9. The medium of claim 8, wherein the instructions, when executed, further cause the processor to section the display list into strips by:
   sorting display commands of the display list by vertical location on a page;
   and allocating the sorted display commands into groups of display commands corresponding to horizontal image strips of the page.

10. The medium of claim 8, wherein the instructions, when executed, further cause the processor to determine if the image strips can be rasterized within the predetermined amount of time by:
    calculating a rasterization execution time (RET) for the image strip;
    calculating a rasterization time available (RTA) for the image strip; and
    comparing the RET of the image strip to the RTA of the image strip.

11. The medium of claim 10, wherein the instructions, when executed, further cause the processor to add a surplus processing time from an RET for a previous image strip to the RTA for the image strip.

12. The medium of claim 10, wherein the instructions, when executed, further cause the processor to:
    subtract the RTA of the image strip from the RET of the image strip; and
    convert a difference between the RTA and RET into a corresponding quantity of display list commands in the image strip.

13. The medium of claim 8, wherein the instructions, when executed, further cause the processor to:
    rasterize a remainder of the image strip during use by a print engine of rasterized data for a previous image strip; and
    send rasterized data for the image strip to the print engine.

* * * * *

UNITED STATES PATENT AND TRADEMARK OFFICE
CERTIFICATE OF CORRECTION

| | | |
|---|---|---|
| PATENT NO. | : 7,145,669 B2 | Page 1 of 1 |
| APPLICATION NO. | : 10/353333 | |
| DATED | : December 5, 2006 | |
| INVENTOR(S) | : Dana A. Jacobsen | |

It is certified that error appears in the above-identified patent and that said Letters Patent is hereby corrected as shown below:

In column 8, line 65, in Claim 2, delete "Into" and insert -- into --, therefor.

In column 9, line 11, in Claim 4, delete "fi-om" and insert -- from --, therefor.

In column 9, line 14, in Claim 5, delete "overun" and insert -- overrun --, therefor.

Signed and Sealed this

Ninth Day of December, 2008

JON W. DUDAS
*Director of the United States Patent and Trademark Office*